US009967316B2

(12) United States Patent
Mahbod

(10) Patent No.: US 9,967,316 B2
(45) Date of Patent: May 8, 2018

(54) ACCESSING MEDIA ITEM REFERENCED IN APPLICATION

(71) Applicant: Google Inc., Mountain View, CA (US)

(72) Inventor: Aurash Mahbod, San Jose, CA (US)

(73) Assignee: Google LLC, Mountain View, CA (US)

( * ) Notice: Subject to any disclaimer, the term of this patent is extended or adjusted under 35 U.S.C. 154(b) by 398 days.

(21) Appl. No.: 14/168,109

(22) Filed: Jan. 30, 2014

(65) Prior Publication Data

US 2015/0215377 A1    Jul. 30, 2015

(51) Int. Cl.
| | |
|---|---|
| *G06F 15/16* | (2006.01) |
| *H04L 29/08* | (2006.01) |
| *H04N 21/2343* | (2011.01) |
| *H04N 21/2662* | (2011.01) |
| *H04N 21/258* | (2011.01) |
| *H04N 21/2747* | (2011.01) |
| *H04N 21/431* | (2011.01) |
| *H04N 21/81* | (2011.01) |
| *H04N 21/858* | (2011.01) |

(52) U.S. Cl.
CPC ............ *H04L 67/10* (2013.01); *H04L 67/06* (2013.01); *H04N 21/23439* (2013.01); *H04N 21/25825* (2013.01); *H04N 21/2662* (2013.01); *H04N 21/2747* (2013.01); *H04N 21/431* (2013.01); *H04N 21/8173* (2013.01); *H04N 21/8586* (2013.01)

(58) Field of Classification Search
CPC ... H04L 67/10; H04L 67/06; H04L 21/23439; H04L 21/25825; H04L 21/2662; H04L 21/2747; H04L 21/431; H04L 21/8173; H04L 21/8586

USPC ................................................... 709/217, 219
See application file for complete search history.

(56) References Cited

U.S. PATENT DOCUMENTS

| | | | |
|---|---|---|---|
| 8,181,107 B2 | 5/2012 | Melnyk et al. | |
| 8,875,029 B1 * | 10/2014 | Naidu | G06Q 10/107 |
| | | | 715/752 |
| 2005/0102260 A1 * | 5/2005 | Spring | G06F 17/30056 |
| 2007/0055936 A1 * | 3/2007 | Dhanjal | G06F 17/227 |
| | | | 715/700 |
| 2007/0208704 A1 * | 9/2007 | Ives | G06F 17/30905 |
| 2007/0260604 A1 * | 11/2007 | Haeuser | H04L 63/10 |

(Continued)

FOREIGN PATENT DOCUMENTS

| | | |
|---|---|---|
| WO | 2010094927 | 8/2010 |
| WO | 2012035331 | 3/2012 |

*Primary Examiner* — Viet D Vu
(74) *Attorney, Agent, or Firm* — Shumaker & Sieffert, P.A.

(57) ABSTRACT

The presently disclosure provides methods and system for reducing the size of an application by replacing a media item in the application with a reference to the media item stored in a remote storage location. A method may include detecting a media item in an application and storing the media item in a remote storage location. The media item in the application may be replaced with a reference to the media item stored in the remote storage location and the application may be provided to a device. A media item request may be received from the device, and the media item request may indicate a parameter associated with the requested media item. The media item stored in the remote storage location may be scaled based on the parameter associated with the media item request and the scaled media item may be provided to the device.

22 Claims, 5 Drawing Sheets

(56) References Cited

U.S. PATENT DOCUMENTS

| | | | |
|---|---|---|---|
| 2008/0222621 A1 | 9/2008 | Knight et al. | |
| 2012/0278407 A1* | 11/2012 | Meisels | H04L 51/08 709/206 |
| 2012/0290926 A1* | 11/2012 | Kapadia | G06F 17/2288 715/255 |
| 2014/0012949 A1* | 1/2014 | Meyers | H04L 67/1095 709/217 |
| 2015/0019545 A1* | 1/2015 | Chedeau | G06F 17/3053 707/725 |
| 2015/0326694 A1* | 11/2015 | Westberg | H04L 67/2823 709/203 |

* cited by examiner

… (US 9,967,316 B2)

ACCESSING MEDIA ITEM REFERENCED IN APPLICATION

BACKGROUND

Mobile applications are often much larger in size than necessary. As a result, the time required to download and run an application is longer than necessary. One reason that mobile applications are so large in size is because application developers generally include multiple versions of media items (e.g., images, audio clips, video clips, etc.) within an application in order to support the 10000+ unique hardware devices on which the application may be downloaded and run. For example, a tablet generally requires much higher resolution images than a small 3" phone. Some mobile application platforms allow developers to build multiple versions of an application and customize each version of the application for individual devices or device-type classifications (e.g., tablet, phone, etc.). This technique, however, can be cumbersome and expensive for developers as it can be difficult for developers to maintain multiple versions of an application, and in some cases, can result in a one size fits all application version for phones, tablets, etc., which may affect the download speed and quality of the application on certain devices and/or device-types.

BRIEF SUMMARY

According to an embodiment of the disclosed subject matter a method may include detecting a media item in an application and storing the media item in a remote storage location. The media item in the application may be replaced with a reference to the media item stored in the remote storage location and the application may be provided to a device. A media item request may be received from the device, and the media item request may indicate a parameter associated with the requested media item. The stored media item may be scaled based on the parameter associated with the media item request and the scaled media item may be provided to the device.

According to an embodiment of the disclosed subject matter a method may include receiving, at a device, an application from an application provider. It may be determined that the application includes a reference to the media item stored in the remote storage location for a media item in the application. A request for the media item based on the reference may be provided and the media item request may indicate a parameter associated with the requested media item. A media item provided based on the parameter may be received.

According to an embodiment of the disclosed subject matter a method may include storing a plurality of versions of a media item in a remote storage location. The plurality of versions of the media item in an application may be replaced with a reference to the media item stored in the remote storage location and the application may be provided to a device. A media item request may be received from the device and the media item request may indicate a first parameter associated with the requested media item. A first version from among a plurality of versions of the media item may be provided to the device and the first version may correspond to the first parameter.

An implementation of the disclosed subject matter provides a system including a processor configured to detect a media item in an application and store the media item in a remote storage location. The media item in the application may be replaced with a reference to the media item stored in the remote storage location and the application may be provided to a device. A media item request may be received from the device and the media item request may indicate a parameter associated with the requested media item. The stored media item may be scaled based on the parameter associated with the media item request and the scaled media item may be provided to the device.

An implementation of the disclosed subject matter provides a system including a processor configured to receive, at a device, an application from an application provider. It may be determined that the application includes a reference to a remote storage location for a media item in the application. A request for the media item based on the reference may be provided and the media item request may indicate a parameter associated with the requested media item and a media item provided based on the parameter may be received.

An implementation of the disclosed subject matter provides a system including a processor configured to store a plurality of versions of a media item in a remote storage location and replace one or more of the plurality of versions of the media item in an application with a reference to the one or more versions of the media item in a remote storage location. The application may be provided to a device and a media item request may be received from the device. The media item request may indicate a first parameter associated with the requested media item. A first version from among a plurality of versions of the media item may be provided to the device and the first version may correspond to the first parameter.

The present disclosure provides methods and system for reducing the size of an application by replacing a media item in the application with a reference to the media item stored in a remote storage location thereby reducing the size of the application. The present disclosure provides for significant improvements to download and installation speed for applications as well as significant reduction in the amount of disk space used per application. The system may be able to clean up cached media items and reclaim space that would previously have been used to hold all of the media items associated with an application. As a result, media items requested/cached by a client device may be tailored to that specific device thereby eliminating "one size fits all" applications. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
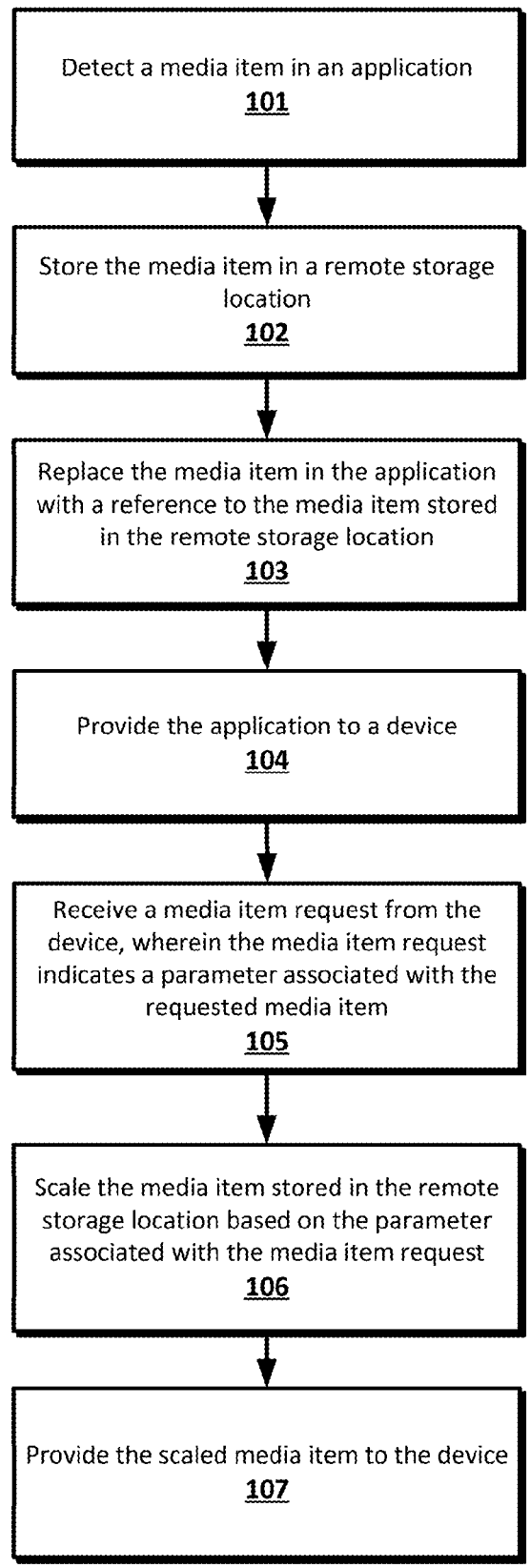
FIG. 1 shows an example process according to an implementation of the disclosed subject matter.

Applications are generally much larger in size than necessary. As a result, the time required to download and run an application can be longer than necessary. One reason that applications are so large in size is because application developers generally include multiple sizes and/or qualities of media items within an application in order to support the 10000+ unique hardware devices on which the application may be downloaded and run. For example, a tablet generally requires much higher resolution images than a small 3" phone, and an application may include multiple versions of the same image for display on a relevant device size and/or device-type.

Some application platforms (e.g., application providers or application marketplaces) allow developers to build multiple versions of an applications and customize each application for individual devices or device-type classifications (e.g., tablet, phone, etc.). This technique, however, can be cumbersome and expensive for developers as it can be difficult for developers to maintain multiple versions of an application. To alleviate the difficulty of managing so many version of the same application, a developer may create a one size fits all version of an application for all device-types, which may affect the quality of the application and images on certain devices and/or device-types.

The present disclosure provides a method for reducing the size of a mobile application by replacing a media item in the application with a reference to a remote storage location where the media item is stored. According to the present disclosure, the UI framework running on a device may be modified as well as the system (e.g., an application marketplace provider) used for hosting of the application. As an example, a developer may provide an application to an application provider such as an application marketplace provider. The application marketplace provider may remove any media items from the application and host these media items in a remote storage location such as a cloud-database system. The media item in the application may be replaced with a reference to the media item stored in the remote storage location where the media item is stored, for example the media item may be replaced with a pointer to a URL from where the media item may be retrieved. When a request to download the application is received from a user of the application marketplace, the application size is significantly smaller because the application does not include media items or multiple versions of the media items. As a result, the application may download to a device much more quickly.

When the application is run or installed on a device, it may be determined that the application includes a reference to a remote storage source from where a media item for the application may be retrieved. The device may request the media item and the request may include a parameter about the size and/or quality of media item requested, for example the parameter may be based on the device-type, the specific device model, the display size, and the like. The media item may be scaled according to the parameter and provided to the device. This disclosed technique removes the need to send all versions of media items in an application to a device at the time of downloading an application. This may result in much faster download of an application. In addition, because each media item may be scaled to the specific parameters ideal for the particular device running the application, presentation of media items in the application on the device may be optimized.

In some cases, a device may download images in the order in which they are needed by the application. For example, if an application has 1 GB of images and 500 KB of code, a user may download the 500 KB of code and open the application. Upon initially running the application on a device, this may trigger the download of a small fraction of the 1 GB of images. This would allow the user to download and open the application sooner than if 500 KB of code and 1 GB of images were downloaded all at once. In addition, by allowing the application provider to provide a scaled image based on a parameter included in a media item request from the device, the images downloaded may be optimized for the specific device. As a result, disk space may not be wasted by having to download and store multiple images that would have to be scaled locally at the device. Additionally, an application provider may be able to scale the size of the image precisely based on the parameter that was indicated in a media item request received from a device before providing the image to the device. As a result, "one size fits all" applications may be eliminated and the images requested/cached by a device may be tailored to the specific device that requested the image. Further, the application provider may cache the scaled image locally and provide it to other devices requesting the image with the same parameters in the future, saving time and resources.

The present disclosure provides for significant improvements to the download and installation speeds for an application, as well as significant reduction in the amount of disk space required by an application. FIG. 1 shows an example process according to an implementation of the disclosed subject matter. As shown, a media item may be detected in an application, at 101. Detection a media item in an application may be performed by an application provider such as an application marketplace, or any other entity that may receive an application. The detected image may be stored in a remote storage location at 102. The image in the application may be replaced with a reference to the image stored in the remote storage location, at 103. A remote storage location may be any database or storage location that may be used to store a media item. A remote storage location may also be a source from which the image may be retrieved. In some cases, the remote storage location may be a cloud-based storage system storing the image. A cloud-based storage system may be a database that runs on a cloud computing platform and may be used to store content. A cloud-based storage system may be remote (which may or may not be local to a device or application provider) from a device and/or an application provider and may be accessed by a wireless or wired connection. By removing the image from the application and replacing the image with a reference to the image stored in the remote storage location, the overall size of the application may be significantly reduced. The application may be provide to a device, at 104, and a media item request may be received from the device, at 105. The image request may indicate a parameter associated with the requested image.

A device may be any device that may download and/or run an application. For example, a device may be a smartphone, a tablet, a laptop, a PC, a mobile device, a wearable computer, and the like. As shown at 105, the device may provide a media item request indicating a parameter associated with the requested image. A parameter may be any factor or information that may be used to appropriately scale a media item for the device requesting the image. For example, a parameter may be a device-type or a device category. A device-type may indicate the particular brand, model, version, and the like of a device, such as Smartphone version 6.1 or Tablet XYZ version 1.0. A device category may indicate that the device is a smartphone, a tablet, a wearable computer, and the like. Additionally, a parameter may be, for example, a resolution (e.g., 1024×768 pixels, 3.1 pixels, and the like) or a media item size (e.g., 600 pixels, 80K, 8×10 inches, and the like). In addition, a parameter indicated in a media item request may include multiple factors described above.

Referring back to FIG. 1, the stored media item may be scaled based on the parameter associated with the media item request, at 106, and the scaled media item may be provided to the device, at 107. A media item may be scaled using any technique for altering, resizing, adjusting, modifying, and/or creating a particular quality or size of the media item. In some cases, scaling a media item may increase or reduce proportionately in size according to a given parameter. Because the media item is scaled based on the parameter received from the device, the size and/or quality of the media item may be optimized for the device. In some cases, the system may also generate multiple versions of the media item detected in the application. Each version among the multiple versions may have a different scale ratio, for example, each scale ratio may be tailored for a particular device-type, device-category, resolution, quality, and/or media item size. In this case, the scaled media item provided to the device, at 107, may be one of the generated versions of the media item.

In general, examples of a media item may be an image, an audio clip, a video clip, and the like. According to an implementation, a detected media item in an application may be a media item included in the application code and not a media item that may be retrieved by the application. For example, a media item may be an internal component of the application, an interface component of the application, and any other media item that forms part of the application. As an example, a social networking application may allow users to share images with one another. As another an example, the same social networking application's code may include a media item associated with a button including a logo that may be selected by a user of the application. Based on this social networking application example, a media item as used herein may refer to a logo, a graphic, a symbol, a design, and the like, that forms part of the application, and not a media item that may be uploaded, retrieved, and/or shared by a user of the application. As another example, the application code for a gaming application Veggie Fighter may include images of vegetables that are interface components of the application that are displayed when the application is run on a device. Such media items may be referred to as internal components or similar assets of the application such as images and drawable assets, in contrast to a media item that is merely used or accessed by the application, such as a media item provided by a user or downloaded from a third-party website that is not associated or integrated with the application.

Figure 2:
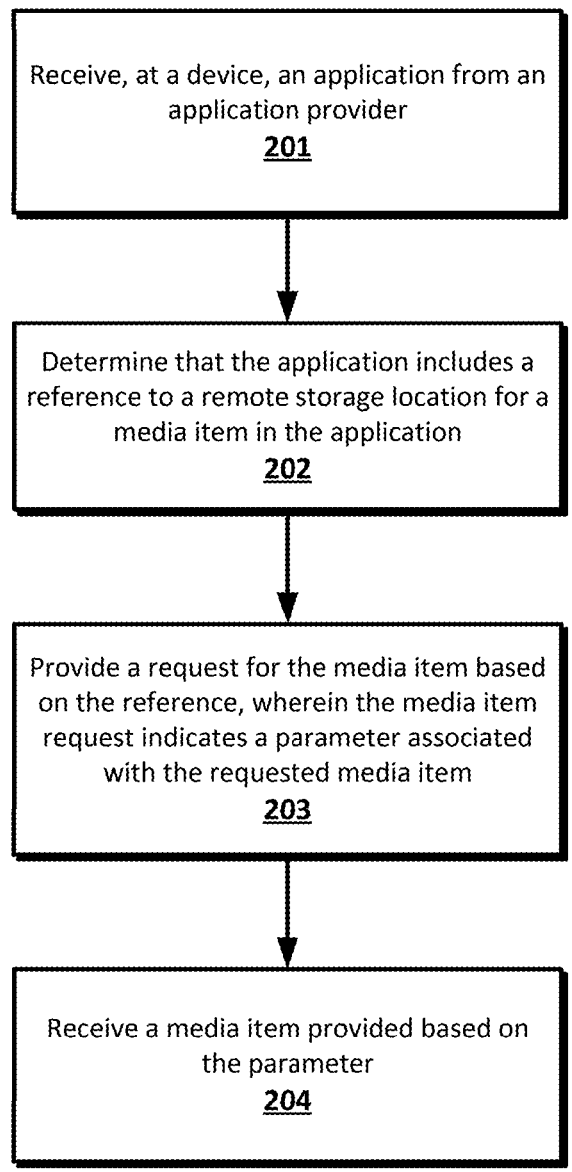
FIG. 2 shows an example process according to an implementation of the disclosed subject matter.

FIG. 2 shows an example process according to an implementation of the disclosed subject matter. According to an implementation, a method may include receiving, at a device, an application from an application provider, at 201. It may be determined that the application includes a reference to a remote storage location for a media item in the application, at 202. Based on this determination at 202, a request for the media item based on the reference may be provided at 203. The media item request may indicate a parameter associated with the requested media item. As a result, a media item provided based on the parameter may be received, at 204. As discussed above, the parameter may be based on the device, for example, the parameter may indicate a device-type, a device category, a media item size, a resolution, a quality, and any other information that may be used to scale the media item for the device requesting the media item.

According to an implementation, a request to run the application on the device may be received prior to determining that the application includes a reference to a remote storage location for an image in the application. In some cases, a device may opportunistically request one or more images in an application as needed while running the application. For example, the application code for a weather application may include three images—image #1, image #2, and image #3. An application provider may store the three images in a remote storage location and replace each of the images in the application code with a reference to the image in the remote storage location. The weather application, in particular, the application code including references to the images (i.e., without the three images) may be received at a device from the application provider. A user of the device may request to run the weather application. When running the application, it may be determined that the application includes a reference A to image #1 stored in the remote storage location in the application. Upon making this determination, a request for image #1 based on the reference A may be provided, for example, to the remote storage location. The image request may indicate a parameter associated with the device, and as a result, image #1 that has been scaled based on the parameter may be received by the device. In some cases, the reference A in the application may be replaced with the received image #1. Image #1 may be presented to the user as appropriate when the application is run on the device. At a later point in time and as the application continues to run on the device, it may be determined that the application includes a reference B to image #2 stored in a remote storage location in the application. Upon making this determination, a request for image #2 based on the reference B may be provided to the remote storage location. Again, the image request may indicate a parameter, and as a result, image #2 that has been scaled based on the parameter may be received by the device. The application may continue to run on the device, and at a later point in time, for example in response to a particular action taken by the user in the application, it may be necessary to present image #3 to the user. It may be determined that that the application includes reference C to image #3 stored in the remote storage location. A request for image #3 (indicating a parameter) based on the reference C may be provided to the remote storage location and in response, image #3 that has been scaled based on the parameter may be received at the device. By allowing a device to opportunistically request one or more media items in an application as needed when running the application, only those media items required while running application may be downloaded and stored by the device. This may result in optimization of storage space as well as significant space savings on a device. Furthermore, this technique may also allow for control over when a media item is downloaded to a device, for example to minimize the cellular data usage on a mobile device, or by only allowing media items to be downloaded when the device has a Wi-Fi connection, etc.

Similarly, the process of identifying and obtaining appropriate versions of images may be performed when the application is first installed on the device, configured for use, or the like, instead of when the application is run by the user. For example, when the weather application in the above example is first installed on the device, the device may determine that the three images are referenced within the device, and provide appropriate requests and parameters at that time. Thus, all the appropriately-scaled versions of images used in the application may be obtained before the application is run by the user.

The process of identifying and obtaining an image for an application may occur at any layer of a device, for example, the steps may be performed by an application itself, a package manager (which may or may not be the operating system level), the operating system, etc. A benefit to determining the need for an image in an application at the operating system level of a device is that if at any point in the future the device runs out of disk space, previously cached images for an application could be cleared and downloaded again at a later point when needed while running the application. In some cases, a device may opportunistically pre-fetch (e.g., provide an image request and receive a scaled image) images for an application prior to running the application on the device.

Figure 3:
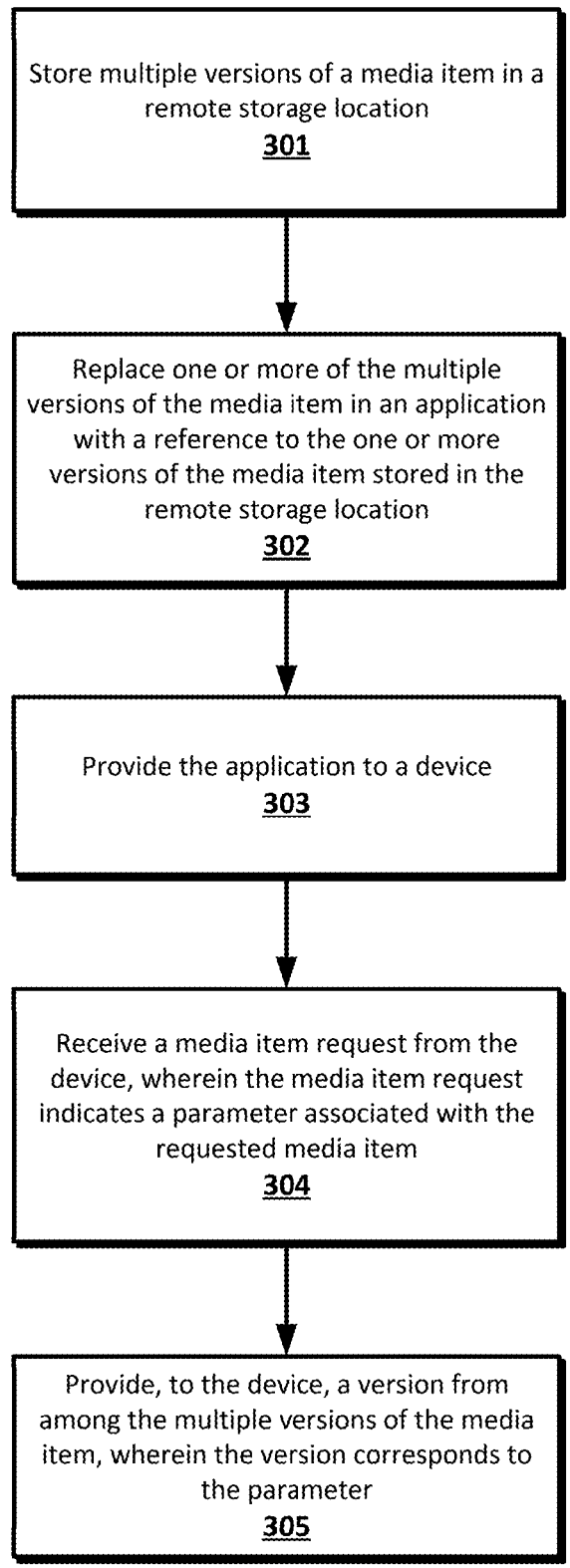
FIG. 3 shows an example process according to an implementation of the disclosed subject matter.

According to an implementation, multiple versions of a media item in an application may be stored and a version of the media item corresponding to a media item request may be provided to a device. FIG. 3 shows an example process according to an implementation of the disclosed subject matter. As shown, multiple versions of a media item may be stored in a remote storage location, at 301. The multiple versions of the media item may be replaced in an application with a reference to the media item stored in the remote storage location, at 302, and the application may be provided to a device, at 303. A media item request may be received from the device and the media item request may indicate a parameter associated with the requested media item, at 304. Next, a version from among the multiple versions of the media item may be provided to the device and the version may correspond to the parameter, at 305.

In some cases, each of the multiple versions of the media item may correspond to one of multiple parameters. As described above, a parameter may be any factor or information that may be used to appropriately scale a media item for the device requesting the media item. For example, a parameter may be a device-type, a device category, a resolution, a media item size, a quality, and the like. As an example, a news application may include three different versions of an image, specifically, version #1 may be for tablet devices, version #2 may be for smartphone devices, and version #3 may be for wearable computers. All three versions may be stored in a remote storage location and the multiple versions may be replaced with a reference to a remote storage location in the application. A user may download the application to his smartphone device. When running the application, it may be determined that the application includes a reference to the image stored in the remote storage location for an image in the application. The device may request the image from the remote storage location based on the reference and the image request may indicate a parameter, for example, that the device is a smartphone. Accordingly, version #2 of the image for smartphone devices may be provided to the device. As a result, the reference to a remote source for the image in the application may be replaced with version #2 of the image. In addition, the user may also download the same news application on his tablet device. When running the application on his tablet device, it may be determined that the application includes a reference to a remote storage location for an image in the application. The tablet device may provide an image request indicating that the device is a tablet, and as such, version #1 of the image for tablet devices may be provided to the device.

Figure 4:
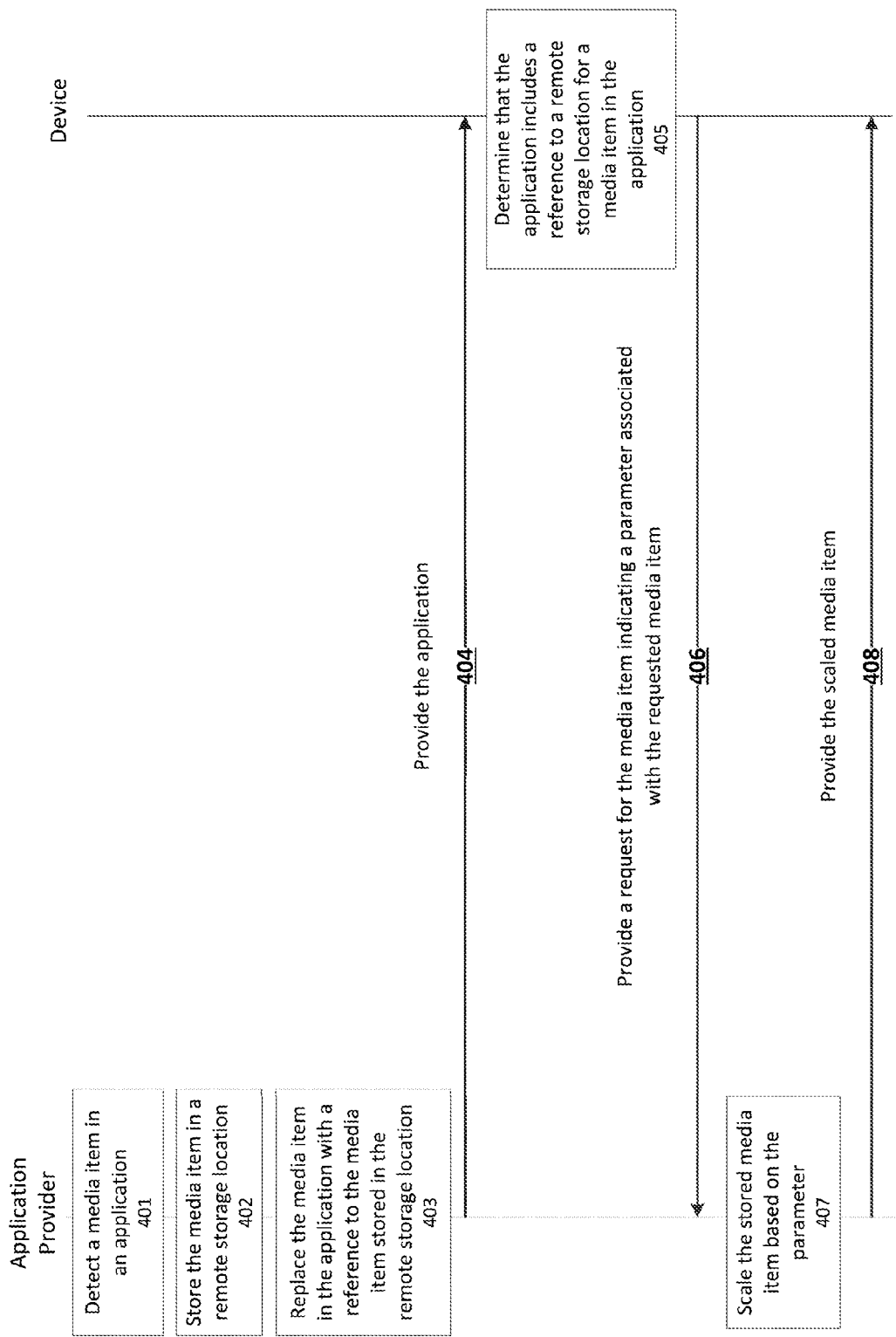
FIG. 4 shows an example information flow according to an implementation of the disclosed subject matter.

FIG. 4 shows an example information flow according to an implementation of the disclosed subject matter. As an example, an application provide may detect an image, such as a graphic, in the code for an application, such as a gaming application, at 401. The application provider may store the image in a remote storage location, at 402, and the application provider may replace the image with a reference to a remote storage location in the code for the gaming application, at 403. For purposes of this example, the process is described with respect to only one image in the application; however, this process of detecting and storing an image, and replacing the image with a reference to a remote storage location in the application code may be performed for any number of images in an application. Next, at 404, the application provider may provide the gaming application to a device, for example, in response to a request to download the gaming application received from the device. The device may download the application code for the gaming application, in particular, each of the images in the application code may have been replaced with a respective reference to a remote storage location. Upon running the application on the device, it may be determined that the application includes a reference to a remote storage location, at 405. Accordingly, the device may provide a request for the image from the application provider at 406, and the image request may indicate a parameter associated with the requested image, such as 1024×768 pixels. The parameter 1024×768 pixels may be the preferred size for the best display of images on the device, the maximum size image displayable by the device, or the like. As such, the application provider may scale the stored image based on the parameter to 1024×768 pixels, at 407. Next, the application provider may provide the scaled 1024×768 pixel image to the device, at 408. The device may then locally store the scaled 1024×768 pixel image and as a result, the scaled image may be displayed when running the gaming application on the device. In addition, the application provider may store the scaled 1024×768 pixel image in a remote storage location and provide it in the future to other devices that may request the same image with the same 1024×768 pixel parameter, saving time and resources.

In an implementation, communication between an application provider, a remote storage location, and a device may be across one or more bridges between the interfaces. For example, the communications between the application provider and a device may be managed or assisted by a third device, such as, a coordinating device, a local coordinator, a remote server, etc. In such cases, the third device may, for example, detect and/or store a media item in a remote storage location, and/or replace the media item with a reference to a remote storage location. The third device may then provide the application to the device, in which case, the third device may also receive a media item request from the device and provide the media item request to the application provider. The application provider may scale the media item based on a received parameter and provide the scaled media item to the third device to be provided to the device. Alternatively, the third device may retrieve the media item from the remote storage location, scale the media item, and provide the scaled media item to the device. Furthermore, more than one intermediate device may be implemented to facilitate communication between an application provider, a remote storage location, and one or more devices.

Although many of the examples described herein describe implementations based on an image, any of the implementations described herein may be used for other media item (e.g., an audio clip, a video clip, etc.). For example, the quality of an audio clip may not be suitable for all devices, such as a 5.1 audio clip which could be dropped if a device does not support 5.1 output. In this case, the quality of the audio may be scaled based on sound quality parameter received from the device, for example, the 5.1 audio clip may be scaled to a different audio quality. Similar scaling may be performing for video clips and any other media item in an application based on a parameter received from a device.

The present disclosure provides for significant improvements to download and installation speed for applications since only the application code without any media items are provided to a device at the time of download. A significant reduction in the amount of disk space used per application may also be achieved. For example, there may be a significant reduction in the amount of disk space used per application by an application provide since all the media items in an application may be stored remotely in a remote storage location. In addition, a device may only receive and store media items for an application as needed, avoiding the need to download and store all media items associated with an application such as those not suitable for the device. In this case, a device may be able to clean up stored media items and reclaim space, as necessary, and re-download media items for an application when needed by the application in the future. Furthermore, media items requested and stored by a device may be scaled specifically for the device thereby eliminating "one size fits all" applications and may result in improved display of media items on the device.

Figure 5:
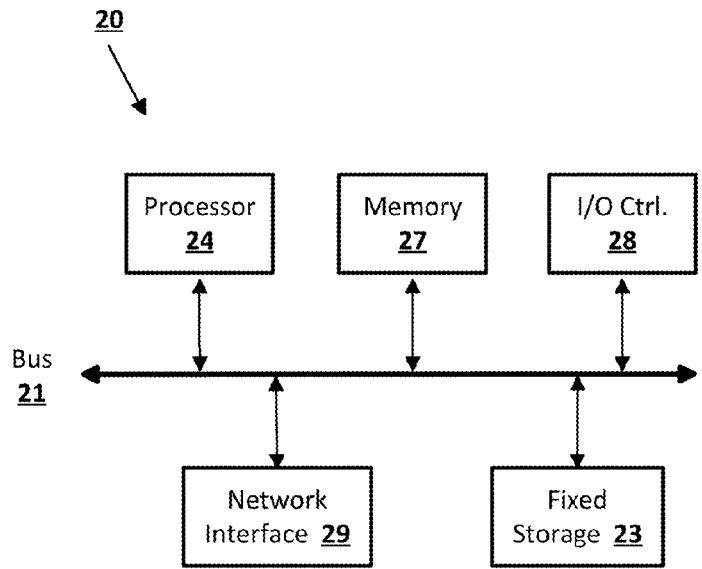
FIG. 5 shows a computer according to an embodiment of the disclosed subject matter.

Embodiments of the presently disclosed subject matter may be implemented in and used with a variety of component and network architectures. FIG. 5 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 6.

Many other devices or components (not shown) may be connected in a similar manner, such as document scanners, digital cameras, auxiliary, supplemental, or backup systems, or the like. Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 6:
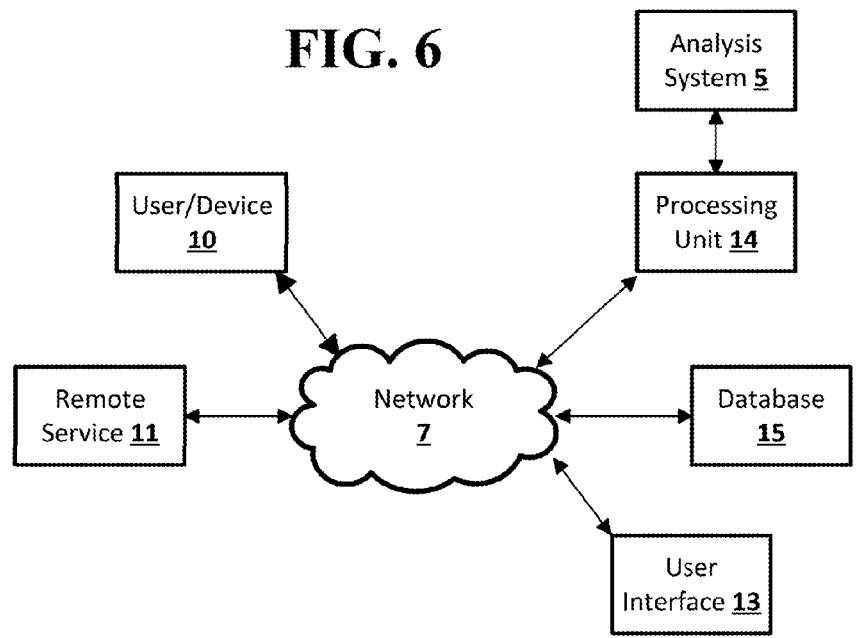
FIG. 6 shows a network configuration according to an embodiment of the disclosed subject matter.

FIG. 6 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as CD-ROMs, DVDs, hard drives, USB (universal serial bus) drives, flash drives, or any other non-transitory machine readable storage medium, such that when the computer program code is loaded into and executed by a computer, the computer becomes an apparatus for practicing embodiments of the disclosed subject matter. Embodiments also may be embodied in the form of computer program code, for example, whether stored in a non-transitory storage medium, loaded into and/or executed by a computer. When the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information, as previously described. The memory or other storage medium may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   detecting media items in an application;
   storing the media items in a remote storage location;
   replacing the media items in the application with references to the media items stored in the remote storage location, the application configured to detect the references in response to being processed on a device, the references configured to cause, in response to being processed on the device in conjunction with running the application on the device, run-time media item requests to be transmitted by the device;
   providing the application to the device;
   prior to a receipt of any of the run-time media item requests, receiving initial media item requests from the device, wherein the initial media item requests indicate a parameter associated with the media items;
   scaling versions of the media items stored in the remote storage location based on the parameter associated with the media item requests to produce scaled media items;
   storing the scaled media items in the remote storage location;
   receiving the run-time media item requests from the device; and
   providing, in response to a receipt of the run-time media requests, the scaled media items to the device.

2. The method of claim 1, wherein at least one of the media items is an interface component of the application.

3. The method of claim 1, wherein the parameter is at least one selected from the group consisting of: a device-type, a resolution, a device category, and a media item size.

4. The method of claim 1, wherein the device is selected from the group consisting of: a smartphone, a tablet, a laptop, a PC, a mobile device, and a wearable computer.

5. The method of claim 1, wherein the remote storage location is a cloud-based storage system configured to store the media items.

6. The method of claim 1, wherein at least one of the media items is an internal component of the application.

7. A method comprising:
   storing, for each of a plurality of media items, a plurality of versions of a media item in a remote storage location;
   replacing at least one of the plurality of versions of the media item in an application with a reference to the at least one of the plurality of versions of the media item in the remote storage location, the application configured to detect the reference in response to being processed on a device, the reference configured to cause, in response to being processed on the device in conjunction with running the application on the device, a run-time media item request to be transmitted by the device;
   providing the application to the device;
   prior to a receipt of any run-time media item request, receiving initial media item requests from the device, wherein the initial media item requests are transmitted in conjunction with an initial installation of the application on the device and indicate a parameter associated with the media items;
   receiving the run-time media item request; and
   providing, to the device, a version from among the plurality of versions of the media item, wherein the version corresponds to the parameter.

8. The method of claim 7, wherein each of the plurality of versions of the media item corresponds to one of a plurality of parameters.

9. The method of claim 7, wherein at least one of the plurality of media items is an interface component of the application.

10. The method of claim 7, wherein the parameter is at least one selected from the group consisting of: a device-type, a resolution, a device category, and a media item size.

11. The method of claim 7, wherein the device is selected from the group consisting of: a smartphone, a tablet, a laptop, a PC, a mobile device, and a wearable computer.

12. A system comprising:
   a processor configured to:
      detect media items in an application;
      store the media items in a remote storage location;
      replace the media items in the application with references to the media items stored in the remote storage location, the application configured to detect the references in response to being processed on a device, the references configured to cause, in response to being processed on the device in conjunction with running the application on the device, run-time media item requests to be transmitted by the device;

provide the application to the device;
prior to a receipt of any of the run-time media item requests, receive initial media item requests from the device, wherein the initial media item requests indicate a parameter associated with the media items;
scale versions of the media items stored in the remote storage location based on the parameter associated with the media item requests to produce scaled media items;
store the scaled media items in the remote storage location;
receive the run-time media item requests from the device; and
provide, in response to a receipt of the run-time media requests, the scaled media items to the device.

13. The system of claim 12, wherein at least one of the media items is an interface component of the application.

14. The system of claim 12, wherein the parameter is at least one selected from the group consisting of: a device-type, a resolution, a device category, and a media item size.

15. The system of claim 12, wherein the device is selected from the group consisting of: a smartphone, a tablet, a laptop, a PC, a mobile device, and a wearable computer.

16. The system of claim 12, wherein the remote storage location is a cloud-based storage system configured to store the media items.

17. The system of claim 12, wherein at least one of the media items is an internal component of the application.

18. A system comprising:
a processor configured to:
store, for each of a plurality of media items, a plurality of versions of a media item in a remote storage location;
replace at least one of the plurality of versions of the media item in an application with a reference to the at least one of the plurality of versions of the media item in the remote storage location, the application configured to detect the reference in response to the application being processed on a device, the reference configured to cause, in response to being processed on the device in conjunction with running the application on the device, a run-time media item request to be transmitted by the device;
provide the application to the device;
prior to a receipt of any run-time media item request, receive initial media item requests from the device, wherein the initial media item requests are transmitted in conjunction with an initial installation of the application on the device and indicate a parameter associated with the media items;
receive the run-time media item request; and
provide, to the device, a version from among the plurality of versions of the media item, wherein the version corresponds to the parameter.

19. The system of claim 18, wherein each of the plurality of versions of the media item corresponds to one of a plurality of parameters.

20. The system of claim 18, wherein at least one of the plurality of media items is an interface component of the application.

21. The system of claim 18, wherein the parameter is at least one selected from the group consisting of: a device-type, a resolution, a device category, and a media item size.

22. The system of claim 18, wherein the device is selected from the group consisting of: a smartphone, a tablet, a laptop, a PC, a mobile device, and a wearable computer.

* * * * *